No. 878,058. PATENTED FEB. 4, 1908.
F. B. GROFF.
SELF ADJUSTING BELT FOR COW MILKERS.
APPLICATION FILED OCT. 1, 1907.
2 SHEETS—SHEET 1.
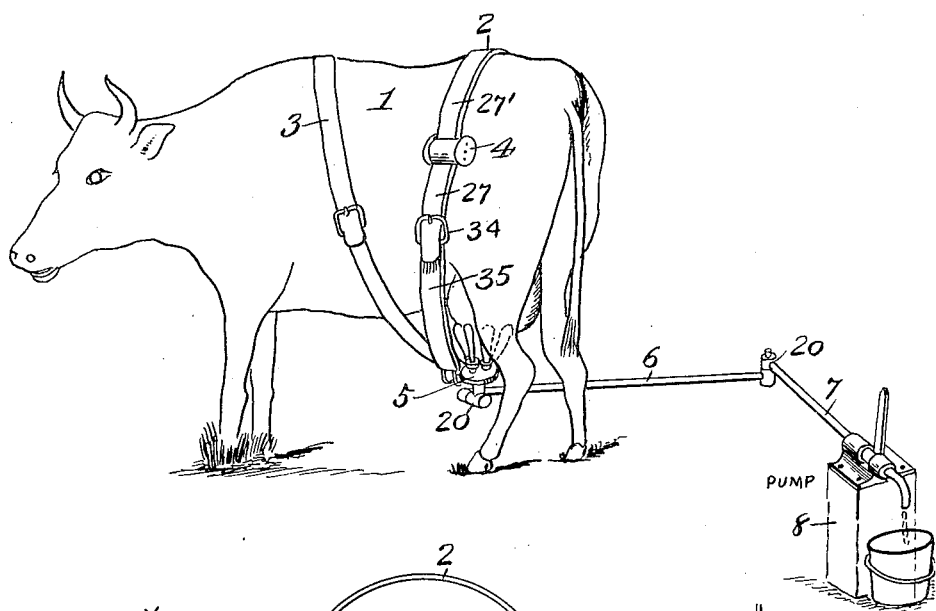
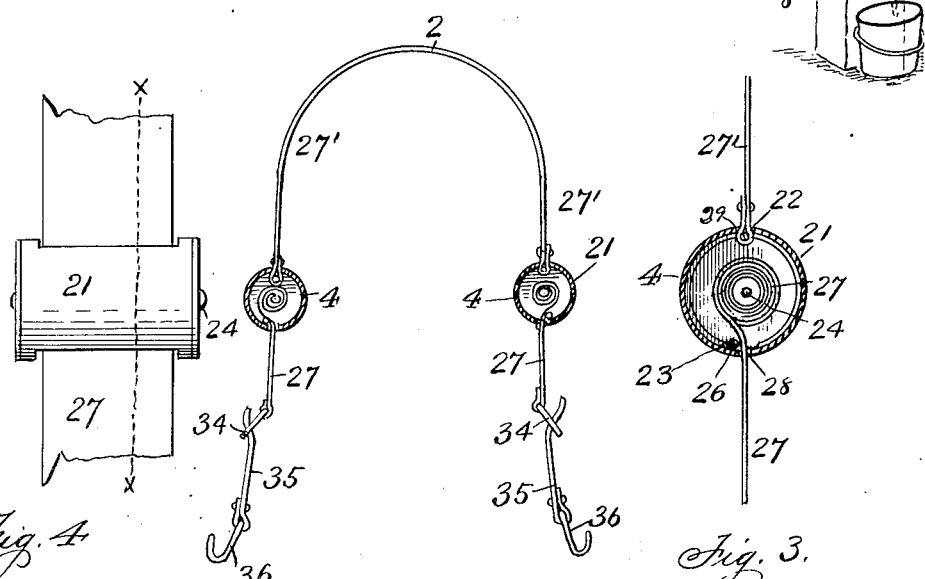
Witnesses
F. L. Ouvand.
P. C. Trott.
Inventor
Floyd B. Groff
By John S. Duffie
Attorney

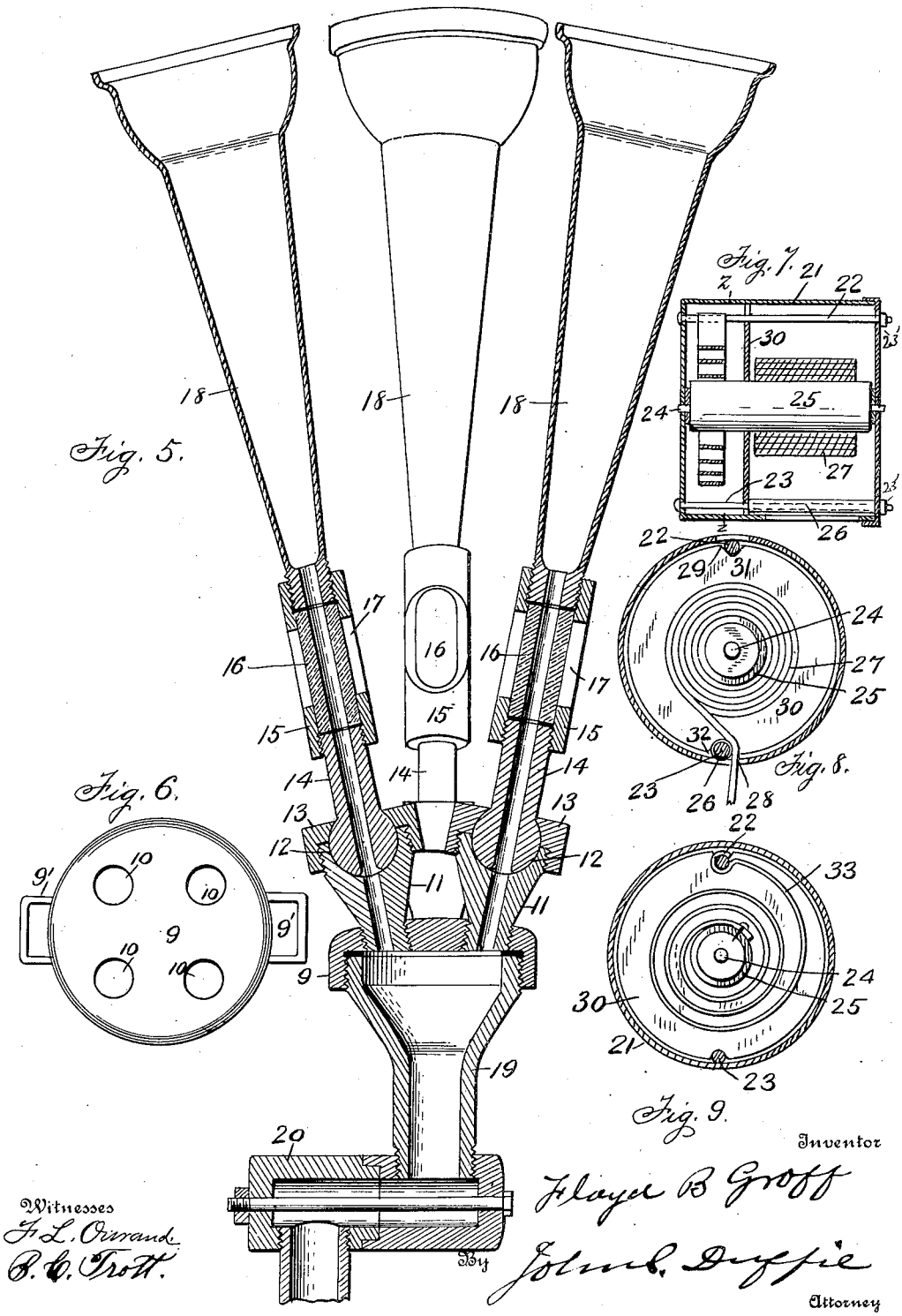

UNITED STATES PATENT OFFICE.

FLOYD B. GROFF, OF ST. JOHNSVILLE, NEW YORK.

SELF-ADJUSTING BELT FOR COW-MILKERS.

No. 878,058.   Specification of Letters Patent.   Patented Feb. 4, 1908.

Application filed October 1, 1907. Serial No. 395,440.

*To all whom it may concern:*

Be it known that I, FLOYD B. GROFF, a citizen of the United States, residing at St. Johnsville, in the county of Montgomery and State of New York, have invented certain new and useful Improvements in Self-Adjusting Belts for Milkers, of which the following is a specification.

My invention has relation to automatic milkers and self-adjusting belts, and consists of the novel construction and arrangement of the parts as set forth in this specification and the claims thereunto attached.

In the accompanying drawings, Figure 1, is a representation of a milch cow, with my invention adjusted in place. Fig. 2, is an edge view of my belt, winding attachments, buckles, etc. Fig. 3, is a cross sectional view on the line $x$ $x$, of Fig. 4. Fig. 4, is a perspective view of my winding device, and parts of the belt. Fig. 5, is an elevation, partly in section and partly in perspective of the milking device minus the pail. Fig. 6, is a top plan view of the plate, holding the lower parts of the universal joint-sockets. Fig. 7, is a sectional view of my winding device. Fig. 8, is a cross section of said winding device, on the line $y$ $y$, of Fig. 7. Fig. 9, is a cross sectional view of Fig. 7, on the line $z$ $z$.

Similar numerals refer to similar parts throughout the several views.

In describing my invention I read the drawings from left to right.

My invention is described as follows:—

The numeral 1, represents the milch cow; 2, represents my self-adjusting belt; 3, is a brace-belt; 4, the winding device; 5, the milker, and 6 and 7 are pipes which lead to the pail 8.

The numeral 9, represents the plate provided with loops $9^1$ and perforations 10, in which perforations are screwed the lower ends of the lower parts 11, of the universal joint-sockets 12; 13, represents the caps which form the upper part of said universal joint-sockets. The two loops $9^1$, extending from the periphery of plate 9, one immediately opposite the other are for the purpose of receiving the hook ends of my self-adjusting belt. In these universal joint-sockets work the bulbed ends of the extensions 14, and to the threaded ends of said extensions 14, are screwed the lower ends of couplings 15. These couplings are provided with glass tubes 16, and with openings 17, to enable the operator to see if the milk is coming down. In the upper end of said couplers 15, are screwed the lower ends of the cups 18. There are usually four cups used, but in the drawing only three are shown.

Attached to the lower face of the plate 9, is a cup 19, to the lower end of which is secured the necessary pipes which carry the milk to the pail. These pipes are provided with the necessary joints 20, that they may be turned in any direction.

My self-adjusting belt consists of a cylinder 21, having end pieces secured in place by tie-rods 22 and 23, and nuts $23^1$. The purpose of said nuts is to allow the end pieces to be easily and readily removed, so that the internal parts of said winding device may be cleaned and repaired. Journaled longitudinally in the center of said cylinder is an axle 24, and rigidly secured on said axle is a drum 25, and working around said axle is a roller 26. Secured to said drum is one end of a belt 27, wound around said drum several times, and its free end is passed over a roller 26, working around said tie-rod 23 and out through a longitudinal slot 28, in the lower part of said cylinder. Immediately above said tie-rod 23, is secured a similar tie-rod 22, and immediately above said tie-rod 22, is a longitudinal slot 29, and secured to said tie-rod 23, is one end of a belt $27^1$, its other end passing up through said slot 29. Immediately to the left of said belts 27 and $27^1$, and encircling said drum, is a perforated disk 30 provided with notches 31 and 32 for the accommodation of said tie-rods. To the left of said circular plate is a spring 33, which has one end secured to said drum, and its other to the upper tie-rod 22. This spring is wound around said drum in a direction opposite to said belt, so that when said belt is pulled on, the said spring is wound up, and when the belt is loosened, the spring unwinds. Said belt $27^1$, passes upwardly, out of slot 29, and over the back of the cow, and has attached to its opposite end a winding device 4, exactly similar to the one just described, and depending from the last-mentioned winding device is a belt 27, exactly similar to the belt $27^1$, mentioned above. To the lower end of each of these last-mentioned belts 27, is secured a buckle 34. Secured in each of these buckles is a strap 35, and secured to the lower end of each of these straps is a hook 36. This combination, the hooks 36, the straps 35, buckles 34, belts 27, winding devices 4, and belt $27^1$, constitute my self-adjusting belt. This belt is passed over the back of the cow with a winding device on each side, the lower ends extending downwardly and hooked in the loops 9', of the plate 9. Extending from the milker 5, forwardly, is another belt 3, to steady said milker, but this belt 3, I do not claim as a part of my invention.

The buckles 34, enable me to fit my belt to any sized cow, and as the cow breathes, the winding device gradually allows the belt to contract and expand, and as the milk is drawn from the udder the belt contracts and keeps the mouths of the cups drawn up against the udder, and where a winding device is on each side of the cow, this contraction and expansion movement is not confined to one side of the cow, but operates equally on both sides, yet it is not absolutely necessary that a winding device be on both sides of the cow; one winding device will give reasonably satisfactory results.

Although I have specifically described the combination, construction and arrangement of the several parts of my invention I do not confine myself particularly to such specific combination, construction and arrangement, as I claim the right to make such changes and modification therein as may clearly fall within the scope of my invention, and which may be resorted to without departing from the spirit, or sacrificing any of my patentable rights therein.

Having described my invention, what I claim as new and desire to secure by Letters Patent, is:—

1. The combination of the upper belt $27^1$; winding devices 4, one secured to each end of said belt; lower belts 27, secured to the lower part of said winding devices; buckles 34, one secured to the lower end of each of said belts 27; straps 35, secured in said buckles; hook 36, secured to the lower ends of said straps; loops $9^1$, and perforated plate 9, secured between said loops, said plate holding the cups, connections, and pipes that lead to a pail, substantially as shown and described and for the purposes set forth.

2. A self-adjusting belt, consisting of a cylinder 21, provided with upper and lower longitudinal slots 28 and 29, respectively; tie-rods 22, 23 and nuts $23^1$; roller 26, working around said rod 23; axle 24, journaled in the end pieces of said cylinder; a drum 25, secured on said axle; a belt 27, having one end secured to said drum, its other end passing down over the roller 26, and through said lower slot; a spring 33, having one end secured to said drum and the other to the corresponding end of said tie-rod 22, passing thence up through said upper slot of said cylinder; a perforated disk, provided with notches 31 and 32, situated at the left of said belts and encircling said drum; buckles 34, secured to the free ends of belts 27 and $27^1$; straps 35, secured to said buckles, and hooks 36, secured to the lower ends of said straps, said hooks adapted to hook in the loops $9^1$, of the perforated plate 9, substantially as shown and described and for the purposes set forth.

3. A self-adjusting belt, consisting of a strap adapted to pass over the back of a milch cow; winding members, one situated on each side of the cow and secured to each end of said strap; straps, each having one end secured to the winding member of said winding device, passing down through the lower part thereof and over a roller; lower straps adjustably secured to the lower ends of said last-mentioned straps, and hooks secured to the free ends of said lower straps, said hooks adapted to be secured in the loops of a perforated plate, substantially as shown and described and for the purposes set forth.

In testimony whereof I affix my signature in presence of two witnesses.

FLOYD B. GROFF.

Witnesses:
BENJAMIN BEEKMAN,
FRED D. STORMS.